July 7, 1931.   E. J. BLAKE ET AL   1,813,656
TURBO GENERATOR
Filed Nov. 12, 1925
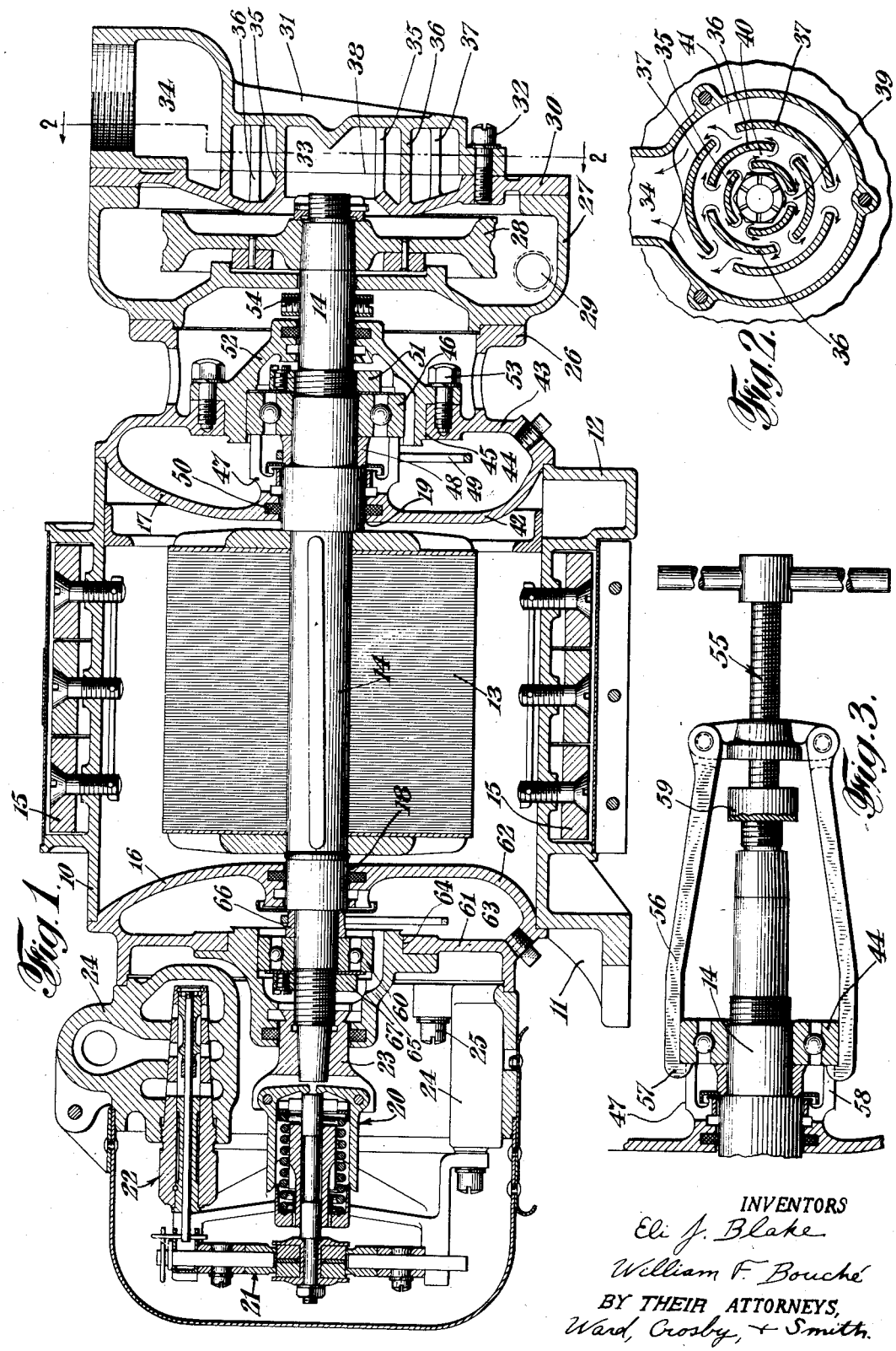
INVENTORS
Eli J. Blake
William F. Bouché
BY THEIR ATTORNEYS,
Ward, Crosby, + Smith.

Patented July 7, 1931

1,813,656

UNITED STATES PATENT OFFICE

ELI J. BLAKE AND WILLIAM FOREST BOUCHE, OF BUFFALO, NEW YORK, ASSIGNORS, BY MESNE ASSIGNMENTS, TO SIMPLEX EQUIPMENT COMPANY, INC., OF NEW YORK, N. Y., A CORPORATION OF DELAWARE

TURBO-GENERATOR

Application filed November 12, 1925. Serial No. 68,644.

This invention relates to improved turbine generator sets and more particularly to turbine generator sets adapted to be mounted on locomotives and supplied with steam therefrom and to provide electric current for the locomotive lights and for other purposes.

One object of this invention is to provide a turbine generator set so constructed that it may be very easily assembled or taken apart for repair and replacement of its parts and particularly the bearings thereof. A further object is to provide a turbine generator set which has a very compact assembly of its various portions which are combined in a simple and efficient manner.

Further and more specific objects, features and advantages of the invention will more clearly appear from the detailed description below taken in connection with the accompanying drawings which form a part of this specification.

In the drawings, Fig. 1 is a vertical sectional view taken through a turbine generator set embodying the improvements in a preferred form thereof, the permanent field magnet pole pieces and the windings being not shown for the sake of simplicity.

Fig. 2 is a sectional view through the exhaust muffler taken substantially along the line 2—2 of Fig. 1, and Fig. 3 illustrates a portion of the turbine generator shaft with a ball bearing thereon and shows a method of removing such bearing with a bearing puller.

In the drawings a generator housing or frame member of non-magnetic material is shown at 10 formed with suitable supporting feet or lugs 11 and 12 and enclosing a rotatable armature structure 13 mounted upon a shaft 14. Suitable means providing a generator field may be mounted upon the frame member 10. In the particular form shown this means may comprise a plurality of permanent magnets as at 15 constructed and mounted in any suitable manner heretofore known, as for example in the manner shown in the patent to William F. Bouché, No. 1,405,180, patented January 31, 1922.

The housing or frame member 10 may be provided with suitable end cover plates as at 16 and 17 which are provided centrally with suitable openings as at 18 and 19 respectively for the passage therethrough of the armature shaft.

On the outer face of the end plate 16 suitable governor mechanism 20, governor valve operating members 21 and a governor valve 22 may be provided for adjusting the flow of steam to the turbine wheel and thereby regulating the speed of the generator. The governor and governor valve and associated parts may be of any suitable construction, as for example that shown in the patent to Eli J. Blake, No. 1,421,660, issued July 4, 1922. The governor parts may be suitably mounted upon a sleeve member 23 removably attached to the end of the shaft 14, whereas the governor valve and associated parts may be mounted upon or form a part of a frame member 24 which is removably attached to the outer face of the end plate 16 by suitable bolts as at 25.

At the turbine end of the generator, the end plate 17 may be suitably extended as at 26 to provide means for attaching a removable turbine wheel housing 27 which encloses a turbine bucket wheel 28 mounted on the overhanging end of the shaft 14. Steam may be applied to the turbine wheel through a pipe as at 29 cooperating with any suitable form of nozzle (not shown).

The outer face of the turbine housing 27 may be closed by a cover plate 30 secured to the housing as by suitable screws. A muffler cap 31 is secured by suitable means such as the cap screws 32 to the cover plate 30.

Members 30 and 31 together form a muffler which is preferably of the annular box-like form as shown. The exhaust from the turbine issues past the end of the shaft 14 into a space 33 which preferably surrounds the axis of the muffler and is in alignment with the generator shaft, from which space the exhaust steam or other gas passes to an exhaust opening 34 of the muffler.

The muffler is so constructed as to provide a plurality of ribs about which the exhaust must pass on its way to the outlet. Preferably these ribs as at 35, 36 and 37 (see Fig. 2) are formed partly on the cover plate 30 and partly on cap member 31. As is shown in Fig. 1, members 30 and 31 each has a number of the ribs referred to, directed toward the other, the aligned portions of these ribs engaging along the plane indicated at 38, the adjacent faces of the contacting members being finished flat to provide tight fitting joints.

The arcuate ribs 35 thus formed extend across the muffler casing from one side to the other surrounding the space 33 into which the exhaust steam from the turbine wheel enters. The ribs 35 are separated by a plurality of openings 39 through which the steam will pass into an annular passage 40 surrounding the ribs 35. The arcuate ribs 36 and 37 successively are of larger diameters than the ribs 35 and are likewise separated by passages alternating respectively in their angular positions whereby a tortuous passageway to an annular space 41 is provided. Space 41 communicates with the outlet 34.

The space enclosed within the turbine housing and cover plate communicates with the atmosphere only by way of the tortuous paths leading from the space 33 to the exhaust opening 34 as indicated by the arrows in the drawings. These paths also constitute substantially the only channels through which sound waves may travel from the interior of the turbine casing to the discharge end of the exhaust pipe.

It will be observed that the paths through which the gases pass to the discharge opening are repeatedly reversed in direction and also that a plurality of paths of different lengths are provided. Thus some of the exhaust proceeds upwardly through the various openings between the ribs by a comparatively short path while other portions of the exhaust may pass through the lowermost openings between the ribs and will have a longer path to travel to the discharge opening 34. As a result the sound impulses passing through the muffler will be out of phase with each other as they enter the exhaust opening and will interfere so as to prevent the exhaust from leaving the opening 34 in a manner to set up loud sound waves in the outside atmosphere. In each of the succeeding labyrinth-like passages a portion of the sound impulses are eliminated so that the sound is successively diminished from one stage to the other with the final result of nearly silent running so far as concerns noise which would otherwise be produced by the exhaust steam.

One of the outstanding difficulties heretofore encountered in the operation and maintenance of turbine generators of the above described type has been the difficulty in removing and replacing the various bearing parts for the purpose of repairing the bearings. With the alternating current generator having the permanently magnetized field as disclosed herein, it is important that the generator armature be retained within the generator frame against inadvertent removal or displacement at all times. The armature comprises a substantial portion of the magnetic circuits of the permanent magnets of the field and acts in the capacity of a "keeper" for such magnets. Accordingly, if the armature is removed, the magnetization of the permanent field magnets is seriously impaired. With this difficulty in mind and with a view to providing a machine in which the bearings at either or both ends could be readily inspected, repaired or replaced without disturbing the armature, the bearing structures hereinafter described were developed.

Referring to the turbine end of the generator the end plate 17 may comprise two walls 42 and 43 with an oil well 44 therebetween. The wall 43 may be formed with a large central opening at 45 and within this opening a ball bearing assembly 46 may be mounted upon the shaft 14 preferably with a forced fit upon such shaft. At the inner side of the ball bearing assembly 46 an extension sleeve 47 may be formed upon the inner end plate wall 42 to extend outwardly therefrom a sufficient distance to abut the bearing assembly. This sleeve is suitably slotted to accommodate a suitable oil ring running over a collar 48 on the shaft to supply oil to the bearing. The opening 19 in the end plate 17 may be formed to receive suitable packing as at 50 for checking the flow of oil inwardly along the shaft. The opening 19 should be of such size that the cover plate 17 and the sleeve 47 just loosely surround the shaft so that when the bearing parts are removed the shaft will be retained substantially in its normal position, thus permitting the bearing parts to be easily and quickly replaced. At the outer side of the bearing assembly a suitable bearing lock nut 51 may be provided upon the shaft. Around the outer periphery of the bearing assembly and within the opening 45 in the end plate wall 43 a bearing keeper ring or cap member 52 may be provided and fixed upon the outer face of the wall 43 by suitable means such as cap screws 53.

In order to remove the ball bearing assembly 46 for inspection, repair or replacement, the turbine wheel housing and the turbine wheel together with the muffler parts should be first removed, a baffle ring member 54 may then be removed from the shaft. Thereupon the bearing cap member 52 is exposed and may be removed by taking out the cap screws 53. Then the lock nut 51 may be readily removed and the bearing will thus be rendered freely accessible for removal in any suitable manner. As illustrated in Fig. 3 a bearing puller 55 may be used. The bearing puller 55 may be provided with suitable extended arms 56 terminating in claw or finger portions 57 for extending around and to the rear of the bearing assembly 46 in the manner illustrated. The sleeve 47 may be formed with portions slotted or cut away as at 58 providing space to admit the finger portions 57. The bearing puller may be formed with a suitable foot portion 59 for engaging the end of the shaft as shown. After applying the puller in the manner shown the bearing may be readily drawn from the shaft by turning the puller handle as will be readily understood.

These operations may be carried out without disturbing the end plate 17 and while the end plate continues to retain the armature shaft and armature substantially in normal position in respect to the magnetized field magnets. After replacing the bearing assembly the various bearing and turbine parts may be readily replaced in the inverse order of their removal. The armature shaft being held during this time in substantially its normal position, no difficulty will be encountered in bringing the various parts into proper position and no time will be wasted in trying to bring unexposed parts into alignment.

At the governor end of the generator a bearing assembly 60 may be provided upon the shaft preferably with a forced fit. Furthermore, the end plate 16 similar to the end plate 17 may be formed with two walls 61 and 62 with an oil well 63 therebetween. The wall 61 adjacent the bearing assembly 16 may be formed with a large opening 64 for receiving a bearing keeper ring or cap member 65 similar to the cap member 52 above described. The bearing assembly 60 may be retained in its proper position longitudinally of the shaft by an oil ring collar 66 at one side thereof and with a lock nut 67 at the other side.

As with the turbine end of the generator, the bearing assembly 60 may be readily removed without disturbing the position of the armature or shaft. The various governor and governor valve parts and connecting members may be first removed and after the frame member 24 has been removed by taking out the cap screws 25 the bearing cap member 65 will be exposed. The cap member 65 and lock nut 67 may then be successively removed whereupon the bearing assembly may be readily removed by the bearing puller in the manner substantially as described above in connection with the turbine end of the machine. During such operations the end plate 16 will retain the armature against inadvertent removal and will serve to hold the armature shaft substantially in normal position so that the various parts may be reassembled without difficulty.

It will be understood that the bearing assemblies 46 and 60 may both be removed at the same time, if desired, and the end plates 16 and 17 will still serve to retain the armature against inadvertent removal.

While we have described our improvements in great detail with respect to a preferred form thereof, we do not desire to be limited to such details or forms since it will be understood that many changes and modifications may be made and the improvements embodied in widely different forms without departing from the spirit and scope of the invention in its broader aspects. We desire therefore to cover all forms coming within the scope or language of any one or more of the appended claims.

What we claim as new and desire to secure by Letters Patent is:

1. In combination an alternating current generator housing or frame member, means providing a generator field comprising permanent magnets mounted upon said member, a rotatable armature forming a substantial portion of the magnetic circuits of said magnets, end cover plates secured to said housing member and preventing inadvertent removal of the armature but being formed with central apertures for passage therethrough of the armature shaft ends, ball bearing assemblies adjacent the outer faces of said end plates and applied to the armature shaft with a forced fit, and bearing cap members for said assemblies removably fixed to the outer faces of said end plates, said end plates being shaped adjacent said assemblies to permit access to the bearings and removal thereof by a bearing puller upon removal of said cap members and while the end plates and armature remain in position.

2. The combination of a generator housing or frame member, means providing a generator field comprising permanent magnets mounted upon said member, a rotatable armature forming a substantial portion of the magnetic circuits of said magnets, end cover plates secured to said housing member and preventing inadvertent removal of the armature but being formed with central apertures for passage therethrough of the armature shaft ends ball bearing assemblies adjacent said end plates and applied to the armature shaft with a forced fit, and bearing cap members for receiving said assemblies removably fixed to the outer faces of said end plates, said end plates being shaped adjacent said assemblies to permit free access to the bearings for removal and replacement thereof upon removal of said cap members and while the end plates retain the armature and its shaft substantially in normal position.

3. In combination, a generator housing or frame member, means providing a greater field comprising permanent magnets mounted upon said member, a rotatable armature forming a substantial portion of the magnetic circuits of said magnets, end cover plates secured to said housing member and preventing inadvertent removal of the armature but being formed with apertures for passage therethrough of the armature shaft, and ball bearing assemblies at said end plates and applied to the armature shaft with a forced fit, but being freely removable and replaceable while the end plates retain the armature and its shaft substantially in normal position.

4. The combination of a generator having an armature, a permanently magnetized field and a frame member therefor, end cover plates secured to said frame member and preventing inadvertent removal of the armature but being formed with apertures for passage therethrough of the armature shaft, and ball bearing assemblies adjacent said end plates fitted by force upon the armature shaft but removable therefrom by means of a bearing puller while the end plates and armature remain in position.

5. The combination of a substantially cylindrical generator housing or frame member, means providing a generator field mounted upon said member, a rotatable armature, end cover plates secured to said housing member and preventing inadvertent removal of the armature and being formed with central apertures for passage therethrough of the armature shaft ends, oil wells formed within said end plates, ball bearing assemblies on the armature shaft and abutting said end plates, and bearing cap members for said assemblies removably fixed to said end plates, said end plates being shaped adjacent said assemblies to permit access to the bearing and removal thereof by means of a bearing puller upon removal of said cap members and while the end plates and armature remain in position.

6. The combination of a generator having an armature and its shaft, a permanently magnetized field and a frame member therefor, end cover plates secured to said frame member and preventing inadvertent removal of the armature but being formed with apertures for passage therethrough of the armature shaft, and a ball bearing assembly adjacent said end plate, fitted by force upon the armature shaft but removable therefrom by means of a bearing puller while the end plate and armature remain in position.

7. In apparatus of the character described, in combination, an electric generator including a frame member and a rotatable member mounted upon a shaft, one of said members having associated with it a permanent magnet and the other member comprising an armature for said magnet, an end cover plate secured to said frame member and preventing inadvertent removal of said rotatable member but being formed with an aperture for passage therethrough of said shaft, and a ball bearing assembly adjacent said end plate, fitted by force upon said shaft but removable therefrom by means of a bearing puller while the end plate and the rotatable member remain in position.

8. The combination of a generator having an armature and its shaft, a permanently magnetized field and a frame member therefor, means secured to said frame member and preventing inadvertent removal of the armature but being formed with apertures for passage therethrough of the armature shaft, and a ball bearing assembly adjacent said means, fitted by force upon the armature shaft but removable therefrom by means of a bearing puller while the said means and armature remain in position.

9. The combination of a generator having an armature and its shaft, a permanently magnetized field and a frame member therefor, an end cover plate secured to said frame comprising spaced inner and outer walls, the outer wall being formed with a relatively large central opening, a bearing assembly having a force fit upon the armature shaft and disposed within said opening but spaced from the edges thereof, a cap member removably secured to said outer wall and having an inwardly extending portion interposed between said bearing assembly and the edges of said opening, and an opening in said inner wall adapted loosely to receive said armature shaft.

10. The combination of a generator having an armature and its shaft, a permanently magnetized field and a frame member therefore, an end cover plate secured to said frame comprising spaced inner and outer walls, the outer wall being formed with a relatively large central opening, a bearing assembly having a force fit upon the armature shaft and disposed within said opening but spaced from the edges thereof, a cap member removably secured to said outer wall and having an inwardly extending portion interposed between said bearing assembly and the edges of said opening, an opening in said inner wall adapted loosely to receive said armature shaft, and an extension sleeve formed upon said inner wall to form an abutment for properly positioning said bearing assembly.

11. The combination of a generator having an armature and its shaft, a permanently magnetized field and a frame member therefor, an end cover plate secured to said frame comprising spaced inner and outer walls, the outer wall being formed with a relatively large central opening, a bearing assembly having a force fit upon the armature shaft and disposed within said opening but spaced from the edges thereof, a cap member removably secured to said outer wall and having an inwardly extending portion interposed between said bearing assembly and the edges of said opening, an opening in said inner wall adapted loosely to receive said armature shaft, an extension sleeve formed upon said inner wall to form an abutment for properly positioning said bearing assembly, and a lock nut provided upon said shaft to bear upon the outer side of said bearing assembly.

In testimony whereof we have signed our names to this specification.

ELI. J. BLAKE.
WILLIAM FOREST BOUCHÉ.